US 12,035,357 B2

(12) United States Patent
Luo et al.

(10) Patent No.: US 12,035,357 B2
(45) Date of Patent: Jul. 9, 2024

(54) METHOD EXECUTED BY USER EQUIPMENT AND USER EQUIPMENT

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 754 days.

(21) Appl. No.: 17/263,891

(22) PCT Filed: Aug. 1, 2019

(86) PCT No.: PCT/CN2019/098854
§ 371 (c)(1),
(2) Date: Jan. 27, 2021

(87) PCT Pub. No.: WO2020/029863
PCT Pub. Date: Feb. 13, 2020

(65) Prior Publication Data
US 2021/0250986 A1    Aug. 12, 2021

(30) Foreign Application Priority Data
Aug. 8, 2018    (CN) .......................... 201810899869.2

(51) Int. Cl.
*H04W 74/00*      (2009.01)
*H04L 5/00*       (2006.01)
(Continued)

(52) U.S. Cl.
CPC ..... *H04W 74/004* (2013.01); *H04L 27/26025* (2021.01); *H04W 56/0015* (2013.01);
(Continued)

(58) Field of Classification Search
CPC ............. H04W 74/004; H04W 74/085; H04W 56/0015; H04W 72/0453; H04L 27/26025; H04L 5/001
See application file for complete search history.

(56) References Cited

U.S. PATENT DOCUMENTS

| | | | |
|---|---|---|---|
| 10,448,432 B1 * | 10/2019 | Chu | ..................... H04L 27/2647 |
| 2018/0098298 A1 * | 4/2018 | Jung | ..................... H04W 72/23 |

(Continued)

FOREIGN PATENT DOCUMENTS

| | | |
|---|---|---|
| CN | 107889236 A | 4/2018 |
| RU | 2595268 C2 | 8/2016 |

(Continued)

OTHER PUBLICATIONS

NTT Docomo, Inc.:"RAN WG's progress on NR WI in the January AH meeting 2018", 3GPP TSG-RAN WG2 #101, R2-1801889, Athens, Greece, Feb. 3, 2018.

(Continued)

*Primary Examiner* — Parth Patel
(74) *Attorney, Agent, or Firm* — ScienBiziP, P.C.

(57) ABSTRACT

The present invention provides a method executed by a user equipment and a user equipment. The method comprises: obtaining a parameter related to generation of an orthogonal frequency division multiplexing (OFDM) baseband signal of a physical random access channel (PRACH); and generating the OFDM baseband signal of the PRACH according to the parameter by using an OFDM baseband signal generation formula for the PRACH; the OFDM baseband signal generation formula for the PRACH includes an item indicating a location of a lowest numbered subcarrier of a lowest numbered resource block, which is occupied by a PRACH transmission occasion in a frequency domain used by the OFDM baseband signal of the PRACH, in a resource grid; the resource grid is a resource grid corresponding to a (Continued)

subcarrier spacing configuration µ of an uplink BWP; and the uplink BWP is an initial active uplink BWP for an initial access or an active uplink BWP for a non-initial access. In this way, the location of the PRACH transmission occasion in the frequency domain used by the OFDM baseband signal of the PRACH can be accurately positioned.

8 Claims, 8 Drawing Sheets

(51) Int. Cl.
*H04L 27/26* (2006.01)
*H04W 56/00* (2009.01)
*H04W 72/0453* (2023.01)
*H04W 74/0833* (2024.01)

(52) U.S. Cl.
CPC ..... *H04W 72/0453* (2013.01); *H04W 74/085* (2013.01); *H04L 5/001* (2013.01)

(56) References Cited

U.S. PATENT DOCUMENTS

| | | | | |
|---|---|---|---|---|
| 2018/0124752 | A1* | 5/2018 | Takeda | H04W 72/04 |
| 2019/0098591 | A1* | 3/2019 | Wu | H04L 27/2607 |
| 2019/0149365 | A1* | 5/2019 | Chatterjee | H04L 5/0094 |
| | | | | 370/329 |
| 2019/0174466 | A1* | 6/2019 | Zhang | H04L 5/0057 |
| 2019/0253292 | A1* | 8/2019 | Abdoli | H04L 27/26025 |
| 2019/0281587 | A1* | 9/2019 | Zhang | H04W 72/23 |
| 2019/0281588 | A1* | 9/2019 | Zhang | H04B 7/0404 |
| 2019/0297629 | A1* | 9/2019 | Lin | H04L 5/0053 |
| 2019/0306832 | A1* | 10/2019 | Si | H04J 11/0069 |
| 2019/0364602 | A1* | 11/2019 | Yi | H04W 72/20 |
| 2020/0128588 | A1* | 4/2020 | Xiong | H04B 7/0617 |
| 2020/0145079 | A1* | 5/2020 | Marinier | H04W 56/0045 |
| 2020/0163124 | A1* | 5/2020 | Da | H04W 74/0833 |
| 2020/0358571 | A1* | 11/2020 | Nimbalker | H04L 27/2602 |
| 2021/0250986 | A1* | 8/2021 | Luo | H04W 74/085 |
| 2022/0022267 | A1* | 1/2022 | Shi | H04W 74/0866 |
| 2022/0159719 | A1* | 5/2022 | Kim | H04W 48/14 |

FOREIGN PATENT DOCUMENTS

| | | |
|---|---|---|
| WO | 2017116491 A | 7/2017 |
| WO | 2018126417 A1 | 7/2018 |

OTHER PUBLICATIONS

NTT Docomo, New SID Proposal: Study on New Radio Access Technology, 3GPP TSG RAN Meeting #71, Goteborg, Sweden, Mar. 7-10, 2016, RP-160671.

NTT Docomo, Inc., New WID on New Radio Access Technology, 3GPP TSG RAN Meeting #75, Dubrovnik, Croatia, Mar. 6-9, 2017, RP-170855.

3GPP. "3rd Generation Partnership Project; Technical Specification Group Radio Access Network; NR; Physical channels and modulation(Release 15)" 3GPP TS 38.211 VI5.0.0, Dec. 31, 2017 (Dec. 31, 2017), section 5.3.

NTT Docomo, Inc. "RAN WG's progress on NR WI in the January AH meeting 2018" 3GPP TSG-RAN WG2 #101 R2-1801889, Mar. 2, 2018 (Mar. 2, 2018), pp. 10 and 11.

Anonymous:"3rd Generation Partnership Project; Technical Specification Group Radio Access Network; NR; Physical channels and modulation (Release 15)", 3GPP Standard; Technical Specification; 3GPP TS 38.211, 3rd Generation Partnership Project (3GPP), Mobile Competence Centre; 650, Route. Des Lucioles; F-06921 Sophia-Antipolis Cedex; France, No. V15.2.0, Jun. 29, 2018, pp. 1-96, XP051474488, *pp. 11-13* * pp. 16-20*.

* cited by examiner

METHOD EXECUTED BY USER EQUIPMENT AND USER EQUIPMENT

FIELD

The present invention relates to the field of wireless communication technology, and more particularly to a method executed by a user equipment, a method executed by a base station, and a corresponding user equipment.

BACKGROUND

At the 3rd Generation Partnership Project (3GPP) RAN#71 plenary meeting held in March 2016, a new study item regarding 5G technical standard (see non-patent document 1) was approved. The purpose of the study item is to develop a new radio (NR) access technology to meet all 5G application scenarios, requirements and deployment environments. The NR has three major use cases: Enhanced Mobile Broadband (eMBB), massive Machine Type Communication (mMTC), and Ultra-Reliable and Low Latency Communications (URLLC). At the 3rd Generation Partnership Project (3GPP) RAN#75 plenary meeting held in June 2017, the corresponding 5G NR work item (see non-patent document 2) was approved.

In 5G, the waveform supported in the downlink direction is CP-OFDM (Cyclic Prefix Orthogonal Frequency Division Multiplexing), and the waveforms supported in the uplink direction include CP-OFDM and DFT-s-OFDM (Discrete Fourier Transformation Spread Orthogonal Frequency Division Multiplexing).

In 5G, the difference between CP-OFDM and DFT-s-OFDM is that the latter performs an operation called "transform precoding" after the layer mapping operation, and the former does not perform this operation.

The key parameters of CP-OFDM and DFT-s-OFDM are subcarrier spacing and cyclic prefix length. In 5G, for a given waveform (e.g., CP-OFDM or DFT-s-OFDM), the use of multiple numerologies (which refer to subcarrier interval, or subcarrier interval and cyclic prefix length) is supported in a cell. The waveform numerologies supported by 5G are shown in Table 1 where two types of cyclic prefixes, "normal" and "extended", are defined.

TABLE 1

Waveform numerologies supported by 5G

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In a given transmission direction of a carrier (which is denoted as x, where if x=DL, then it represents downlink; if x=UL, then it represents uplink or supplementary uplink), a resource grid is defined for each waveform numerology and comprises $N_{grid,x}^{size,\mu} N_{SC}^{RB}$ subcarriers (i.e. $N_{grid,x}^{size,\mu}$ resource blocks with each resource block comprising $N_{SC}^{RB}$ subcarriers) in the frequency domain and $N_{symb}^{subframe,\mu}$ OFDM symbols (i.e., the number of OFDM symbols per subframe with its concrete value related to $\mu$) in the time domain, where $N_{SC}^{RB}$ refers to the number of subcarriers in one resource block (referred to as RB that could be numbered with common resource blocks or physical resource blocks, etc.), and $N_{SC}^{RB}=12$. The lowest numbered common resource block (CRB) of the resource grid is configured by the higher-layer parameter offsetToCarrier, and the number of resource blocks $N_{grid,x}^{size,\mu}$ in the frequency domain is configured by higher-layer parameter carrierBandwidth, where The common resource block is defined for the waveform numerology. For example, for $\mu=0$ (i.e., $\Delta f=15$ kHz), the size of one common resource block is 15×12=180 kHz, and for $\mu=1$ (i.e., $\Delta f=30$ kHz), the size of one common resource block is 30×12=360 kHz.

For all waveform numerologies, the center frequency of subcarrier 0 of common resource block 0 coincides with the same position in the frequency domain. This position is also referred as "point A".

For each waveform numerology, one or more "bandwidth parts (BWP)" may be defined. Each BWP includes one or more contiguous common resource blocks. If it is assumed that the number of a certain BWP is i, then its starting point $N_{BWP,i}^{start,\mu}$ and length $N_{BWP,i}^{size,\mu}$ must fulfil the following relations:

$$N_{grid,x}^{start,\mu} \leq N_{BWP,i}^{start,\mu} < N_{grid,x}^{start,\mu} + N_{grid,x}^{size,\mu}$$

$$N_{grid,x}^{start,\mu} < N_{BWP,i}^{size,\mu} + N_{BWP,i}^{start,\mu} \leq N_{grid,x}^{start,\mu} + N_{grid,x}^{size,\mu}$$

That is, the common resource blocks included in the BWP must be located within a corresponding resource grid. The starting point $N_{BWP,i}^{start,\mu}$ may use the numbering of common resource blocks, that is, it represents the distance (which may be expressed by the number of resource blocks) from the lowest numbered resource block of the BWP to "point A".

Resource blocks within a BWP are also referred to as "physical resource blocks (PRBs)" and numbered from 0 to $N_{BWP,i}^{size,\mu}-1$, where the physical resource block 0 is the lowest numbered resource block of the BWP and corresponds to the common resource block $N_{BWP,i}^{start,\mu}$. When the UE performs an initial access, the used uplink BWP and downlink BWP are respectively referred to as an initial active uplink BWP and an initial active downlink BWP. When the UE performs a non-initial access (i.e., other conditions except the initial access), the used uplink BWP and downlink BWP are respectively referred to as an active uplink BWP and an active downlink BWP.

Subcarriers within a resource block are numbered from 0 to $N_{SC}^{RB}-1$ (that is, the lowest numbered subcarrier is subcarrier 0, and the highest numbered subcarrier is subcarrier $N_{SC}^{RB-1}$) regardless of whether the resource block uses the numbering of common resource blocks or the numbering of physical resource blocks.

In the time domain, both the uplink and the downlink transmissions consist of multiple radio frames (or referred to as system frames, sometimes simply referred to as frames, and numbered from 0 to 1023) with each radio frame having a length of 10 ms, where each frame includes 10 subframes (which are numbered from 0 to 9 in a frame) with each subframe having a length of 1 ms, each subframe includes $N_{slot}^{subframe,\mu}$ slots (which are numbered from 0 to $N_{slot}^{subframe,\mu}-1$ in a subframe), and each slot includes $N_{symb}^{slot}$ OFDM symbols. Table 2 shows the values of $N_{symb}^{slot}$ and $N_{slot}^{subframe,\mu}$ under different subcarrier spacing configurations. Obviously, the number of OFDM symbols per subframe is $N_{symb}^{subframe,\mu} = N_{symb}^{slot} N_{slot}^{subframe,\mu}$.

TABLE 2

Time-domain parameters related to subcarrier spacing configuration μ

| μ | $N_{symb}^{slot}$ | $N_{slot}^{subframe,\mu}$ |
|---|---|---|
| 0 | 14 | 1 |
| 1 | 14 | 2 |
| 2 | 14 | 4 |
| 3 | 14 | 8 |
| 4 | 14 | 16 |

The basic time unit of 5G is $T_c=1/(\Delta f_{max} \cdot N_f)$, where $\Delta f_{max}=480 \cdot 10^3$ Hz an $N_f=4096$. The constant $\kappa=T_s/T_c=64$, where $T_s=1/(\Delta f_{ref} \cdot N_{f,ref})$, $\Delta f_{ref}=15 \cdot 10^3$ Hz, and $N_{f,ref}=2048$.

When there is no risk of causing confusion, the x representing the transmission direction in the subscript of a mathematical symbol can be removed. For example, for a given downlink physical channel or signal, $N_{grid}^{size,\mu}$ can be used to express the number of resource blocks of the resource grid corresponding to the subcarrier spacing configuration μ in the frequency domain.

In the current 3GPP standard specification, the OFDM baseband signal generation formula for any physical channel or signal except PRACH (Physical Random Access Channel) can be expressed as follow:

$$s_l^{(p,\mu)}(t) = \sum_{k=0}^{N_{grid}^{size,\mu} N_{SC}^{RB}-1} a_{k,l}^{(p,\mu)} \cdot e^{j2\pi(k+k_0^\mu - N_{grid}^{size,\mu} N_{SC}^{RB}/2)\Delta f(t-N_{CP,l}^\mu T_c - t_{start,l}^\mu)}$$

where p is an antenna port.

μ is a subcarrier spacing configuration, and $\Delta f$ is its corresponding subcarrier spacing (see Table 1).

l is an OFDM symbol number within a subframe.

$l \in \{0, 1, \ldots, N_{slot}^{subframe,\mu} N_{symb}^{slot}-1\}$.

$k_0^\mu = (N_{grid}^{start,\mu} + N_{grid}^{size,\mu}/2)N_{SC}^{RB} - (N_{grid}^{start,\mu_0} + N_{grid}^{size,\mu_0}/2)N_{SC}^{RB} 2^{\mu_0-\mu}$.

$t_{start,l}^\mu \leq t < t_{start,l}^\mu + ((N_u^\mu + N_{CP,l}^\mu)T_c$.

For l=0, $t_{start,l}^\mu=0$.

For l≠0, $t_{start,l}^\mu = t_{start,l-1}^\mu + (N_u^\mu + N_{CP,l-1}^\mu)T_c$.

$N_u^\mu = 2048\kappa \cdot 2^{-\mu}$.

For extended cyclic prefix, $N_{CP,l}^\mu = 512\kappa \cdot 2^{-\mu}$.

For normal cyclic prefix and l=0 or l=7·2^μ, $N_{CP,l}^\mu = 144\kappa \cdot 2^{-\mu} + 16\kappa$.

For normal cyclic prefix and l≠0 and l≠7·2^μ, $N_{CP,l}^\mu = 144\kappa \cdot 2^{-\mu}$.

μ0 is the largest μ value among the subcarrier spacing configurations provided to the UE for a corresponding carrier.

In the current 3GPP standard specification, the OFDM baseband signal generation formula for PRACH can be expressed as follow:

$$s_l^{(p,\mu)}(t) = \sum_{k=0}^{L_{RA}-1} a_k^{(p,RA)} \cdot e^{j2\pi(k+Kk_1+\bar{k})\Delta f_{RA}(t-N_{CP,l}^{RA} T_c - t_{start}^{RA})}$$

where p is an antenna port.

For an initial access, μ is a subcarrier spacing configuration of an initial active uplink BWP, and $\Delta f$ is its corresponding subcarrier spacing (see Table 1). For a non-initial access, μ is a subcarrier spacing configuration of an active uplink BWP, and $\Delta f$ is its corresponding subcarrier spacing (see Table 1).

$K = \Delta f/\Delta f_{RA}$.

$k_1 = k_0^\mu + N_{BWP,i}^{start} N_{SC}^{RB} + n_{RA}^{start} N_{SC}^{RB} + n_{RA} N_{RB}^{RA} N_{SC}^{RB} - N_{grid}^{size,\mu} N_{SC}^{RB}/2$.

$k_0^\mu = (N_{grid}^{start,\mu} + N_{grid}^{size,\mu}/2)N_{SC}^{RB} - (N_{grid}^{start,\mu_0} + N_{grid}^{size,\mu_0}/2)N_{SC}^{RB} 2^{\mu_0-\mu}$.

μ0 is the largest μ value among the subcarrier spacing configurations provided to the UE for a corresponding carrier.

For an initial access, $N_{BWP,i}^{start}$ is the lowest numbered resource block (which uses the numbering of common resource blocks) of an initial active uplink BWP. For a non-initial access, $N_{BWP,i}^{start}$ is the lowest numbered resource block (which uses the numbering of common resource blocks) of an active uplink BWP.

For an initial access, $n_{RA}^{start}$ is an offset (which is expressed by the number of resource blocks) of the lowest numbered resource block occupied by the lowest PRACH transmission occasion in the frequency domain with respect to the lowest numbered resource block (i.e., the physical resource block 0) of the initial active uplink BWP. For a non-initial access, $n_{RA}^{start}$ is an offset (which is expressed by the number of resource blocks) of the lowest numbered resource block occupied by the lowest PRACH transmission occasion in the frequency domain with respect to the lowest numbered resource block (i.e., the physical resource block 0) of the active uplink BWP.

$n_{RA}$ is an index of the PRACH transmission occasion in the frequency domain used by the OFDM baseband signal of the PRACH. One PRACH transmission described by the OFDM baseband signal of the PRACH corresponds to a PRACH transmission occasion (described by $n_f^{RA}$) in the frequency domain and a PRACH transmission occasion (described by $n_t^{RA}$) in the time domain.

$N_{RB}^{RA}$ is the number of resource blocks occupied by each PRACH transmission occasion in the frequency domain. For an initial access, it is expressed by the number of resource blocks for PUSCH (Physical Uplink Shared Channel) in the initial active uplink BWP. For a non-initial access, it is expressed by the number of resource blocks for PUSCH in the active uplink BWP.

$t_{start}^{RA} \leq t < t_{start}^{RA} + (N_u + N_{CP,l}^{RA})T_c$.

$N_{CP,l}^{RA} = N_{CP}^{RA} + n \cdot 16\kappa$, where for $\Delta f_{RA} \in \{1.25, 5\}$ kHz, n=0;

for $\Delta f_{RA} \in \{15, 30, 60, 120\}$ kHz, n is the number of times the interval $[t_{start}^{RA}, t_{start}^{RA} + (N_u + N_{CP}^{RA})T_c$ [overlaps with either time instance 0 or time instance $$\left(\frac{\Delta f_{max} N_t}{2000}\right) \cdot T_c = 0.5 \text{ ms}$$

in a subframe.

For $\Delta f_{RA} \in \{1.25, 5, 15, 30\}$ kHz, $t_{start}^{RA}$ is the starting position of the PRACH preamble in a subframe, for $\Delta f_{RA} \in \{60, 120\}$ kHz, $t_{start}^{RA}$ is the starting position of the PRACH preamble in a 60 kHz slot. $t_{start}^{RA} = t_{start,l}^{RA}$. For l=0, $t_{start,l}^\mu = 0$; For l≠0, $t_{start,l}^\mu = t_{start,l-1}^\mu + (N_u^\mu + N_{CP,l-1}^\mu)T_c$, where it is assumed that the subframe or 60 kHz slot starts at t=0.

a timing advance value $N_{TA}=0$ is assumed.

The definitions and corresponding values of $N_u^\mu$ and $N_{CP,l-1}^\mu$ are the same with those in the OFDM baseband signal generation formula for any physical channel or signal except PRACH.

$\mu=0$ is assumed for $\Delta f_{RA} \in \{1.25, 5\}$ kHz, otherwise $\mu$ is taken from the $\mu$ values corresponding to $\Delta f_{RA} \in \{15, 30, 60, 120\}$ kHz (see Table 1).

$l=l_0 + n_t^{RA} N_{dur}^{RA} + 14 n_{slot}^{RA}$, where $l_0$ is given by the parameter "starting symbol" in random access configurations. For example, if the PRACH configuration index is 0, then the starting symbol is 0.

$n_t^{RA}$ is the PRACH transmission occasion within the PRACH slot and numbered from 0 to $N_t^{RA,slot}-1$, where for $L_{RA}=839$, $N_t^{RA,slot}=1$; for $L_{RA}=139$, $N_t^{RA,slot}$ is given by the parameter "number of time-domain PRACH occasions within a PRACH slot" in random access configurations.

$N_{dur}^{RA}$ is given by the parameter "PRACH duration" in random access configurations.

If $\Delta f_{RA} \in \{1.25, 5, 15, 60\}$ kHz, then $n_{slot}^{RA}=0$.

If $\Delta f_{RA} \in \{30, 120\}$ kHz and either of "Number of PRACH slots within a subframe" or "Number of PRACH slots within a 60 kHz slot" is equal 1, then $n_{slot}^{RA}=1$.

otherwise, $n_{slot}^{RA} \in \{0, 1\}$ $L_{RA}$, $\Delta f_{RA}$, $N_u$ and $N_{CP}^{RA}$ depend on the PRACH preamble format. For example, if the format is 0, then $L_{RA}=839$, $\Delta f_{RA}=1.25$ kHz, $N_u=24576\kappa$, and $N_{CP}^{RA}=3168\kappa$.

$\bar{k}$ and $N_{RB}^{RA}$ depend on the combination of $L_{RA}$, $\Delta f_{RA}$ and $\Delta f$. For example, if $L_{RA}=839$, $\Delta f_{RA}=1.25$ kHz and $\Delta f=15$ kHz, then $N_{RB}^{RA}=6$ and $\bar{k}=7$.

If the PRACH preamble format in random access configurations is A1/B1, A2/B2 or A3/B3, then if $n_t^{RA}=N_t^{RA,slot}-1$, then the PRACH preamble with the corresponding format B1, B2 or B3 is transmitted in the PRACH transmission occasion.

otherwise, the PRACH preamble with the corresponding format A1, A2 or A3 is transmitted in the PRACH transmission occasion.

In the current 3GPP standard specification, the parameter $k_1$ in the OFDM baseband signal generation formula for PRACH is used for positioning the location of the lowest numbered subcarrier of the lowest numbered resource block, which is occupied by a PRACH transmission occasion in a used frequency domain, in a resource grid where $k_0^\mu - N_{grid}^{size,\mu} N_{SC}^{RB}/2$ corresponds to the lowest numbered subcarrier of the lowest numbered resource block of the resource grid.

$n_{RA}^{start} N_{SC}^{RB}$ is the distance (which is expressed by the number of subcarriers) between the lowest numbered subcarrier of the lowest numbered resource block occupied by the lowest PRACH transmission occasion in the frequency domain and the lowest numbered subcarrier of the lowest numbered resource block of an initial active uplink BWP or an active uplink BWP.

$n_{RA} N_{RB}^{RA} N_{SC}^{RB}$ is the distance (which is expressed by the number of subcarriers) between the lowest numbered subcarrier of the lowest numbered resource block occupied by a PRACH transmission occasion in a frequency domain used by the OFDM baseband signal of the PRACH and the lowest numbered subcarrier of the lowest numbered resource block occupied by the lowest PRACH transmission occasion in the frequency domain.

$N_{BWP,i}^{start} N_{SC}^{RB}$ is the distance (which is expressed by the number of subcarriers) between the lowest numbered subcarrier of the lowest numbered resource block of an initial active uplink BWP or an active uplink BWP and the "point A".

Figure 1:
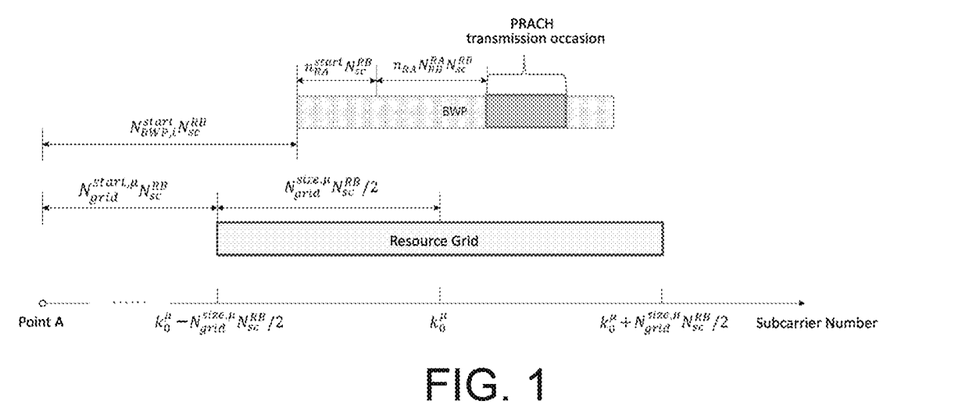
FIG. 1 is a diagram showing the relations among items constituting k1 in an OFDM baseband signal generation formula for PRACH in the current 3GPP standard specification.

FIG. 1 shows the relations among items constituting $k_1$. It can be seen from FIG. 1 that in the current 3GPP standard specification, the $k_1$ may be considered to be constituted by the following two items:

$k_0^\mu - N_{grid}^{size,\mu} N_{SC}^{RB}/2$ corresponds to the lowest numbered subcarrier of the lowest numbered resource block of the resource grid.

$N_{BWP,i}^{start} N_{SC}^{RB} + n_{RA}^{start} N_{SC}^{RB} + n_{RA} N_{RB}^{RA} N_{SC}^{RB}$ corresponds to the distance (which is expressed by the number of subcarriers) between the lowest numbered subcarrier of the lowest numbered resource block occupied by a PRACH transmission occasion in the frequency domain used by the OFDM baseband signal of the PRACH and the "point A".

Therefore, the $k_1$ cannot express the location of the lowest numbered subcarrier of the lowest numbered resource block, which is occupied by a PRACH transmission occasion in a frequency domain used by the OFDM baseband signal of the PRACH, in a resource grid. This may cause the PRACH transmission occasion in the frequency domain used by the OFDM baseband signal of the PRACH is seriously offset from an allocated location. Therefore, there is a need to improve the OFDM baseband signal generation formula for PRACH in the current 3GPP standard specification, so as to accurately position the location of a PRACH transmission occasion in the frequency domain used by the OFDM baseband signal of the PRACH.

In addition, in the current 3GPP standard specifications, no matter whether it is PRACH or any physical channel or signal except PRACH, its OFDM baseband signal generation formula needs to use a reference subcarrier spacing $\mu_0$, that is, the largest $\mu$ value among the subcarrier spacing configurations provided to the UE for a corresponding carrier. This makes two UEs using different sets of subcarrier spacing configurations possibly use different $\mu_0$ values, resulting in different understandings of a subcarrier frequency of the resource grid corresponding to the same subcarrier spacing $\mu$ and thus causing conflicts of physical channels/signals transmitted by different UEs in the frequency domain. Therefore, there is a need to improve the definition of $\mu_0$ in the current 3GPP standard specification so as to eliminate possible conflicts.

Documents of Prior Art

Non-Patent Documents

Non-patent document 1: PR-160671, New SID Proposal: Study on New Radio Access Technology Non-patent document 2: PR-170855, New WID on New Radio Access Technology

SUMMARY

In order to solve at least one part of the above-mentioned problems, the present invention provides a method executed by a user equipment and a user equipment, which can accurately position the location of a PRACH transmission occasion in the frequency domain used by the OFDM baseband signal of the PRACH.

In addition, the present invention further provides a method executed by a user equipment and a user equipment, which can improve the definition of $\mu_0$ in the current 3GPP standard specification so as to avoid conflicts of physical channels/signals transmitted by different UEs in the frequency domain.

According to the present invention, a method executed by a user equipment is provided and comprises: obtaining a parameter related to generation of an orthogonal frequency division multiplexing (OFDM) baseband signal of a physical random access channel (PRACH); and generating the OFDM baseband signal of the PRACH according to the parameter by using an OFDM baseband signal generation formula for the PRACH, wherein the OFDM baseband signal generation formula for the PRACH includes an item indicating a location of a lowest numbered subcarrier of a lowest numbered resource block, which is occupied by a PRACH transmission occasion in a frequency domain used by the OFDM baseband signal of the PRACH, in a resource grid; the resource grid is a resource grid corresponding to a subcarrier spacing configuration of an uplink BWP; and the uplink BWP is an initial active uplink BWP for an initial access or an active uplink BWP for a non-initial access.

In the above method, the item includes an offset of a lowest numbered subcarrier of a lowest numbered resource block of the uplink BWP with respect to a lowest numbered subcarrier of a lowest numbered resource block of the resource grid, and the offset is expressed by the number of subcarriers.

In the above method, the item includes an offset of the lowest numbered subcarrier of the lowest numbered resource block occupied by the PRACH transmission occasion with respect to a lowest numbered subcarrier of a lowest numbered resource block of the resource grid, and the offset is expressed by the number of subcarriers.

In the above method, the offset of the lowest numbered subcarrier of the lowest numbered resource block occupied by the PRACH transmission occasion with respect to the lowest numbered subcarrier of the lowest numbered resource block of the resource grid is expressed as follow:

$$(N_{BWP,i}^{start} - N_{grid}^{start,\mu})N_{SC}^{RB} + n_{RA}^{start}N_{SC}^{RB} + n_{RA}N_{RB}^{RA}N_{SC}^{RB}$$

where $N_{BWP,i}^{start}$ is the lowest numbered resource block of the uplink BWP, and the resource block uses the numbering of common resource blocks; $N_{grid}^{start,\mu}$ is the lowest numbered resource block of the resource grid, and the resource block uses the numbering of common resource blocks; $N_{SC}^{RB}$ is the number of subcarriers in one resource block; $n_{RA}^{start}$ is an offset of the lowest numbered resource block occupied by the lowest MACH transmission occasion in the frequency domain with respect to the lowest numbered resource block of the uplink BWP, and the offset is expressed by the number of resource blocks; $n_{RA}$ is an index of the PRACH transmission occasion in the frequency domain used by the OFDM baseband signal of the PRACH; $N_{RB}^{RA}$ is the number of resource blocks occupied by each PRACH transmission occasion in the frequency domain.

In the above method, the item is expressed as follow:

$$k_1 = k_0^\mu + (N_{BWP,i}^{start} - N_{grid}^{start,\mu})N_{SC}^{RB} + n_{RA}^{start}N_{SC}^{RB} + n_{RA}N_{RB}^{RA}N_{SC}^{RB} - N_{grid}^{size,\mu}N_{SC}^{RB}/2$$

where $k_0^\mu - N_{grid}^{size,\mu}N_{SC}^{RB}/2$ corresponds to the lowest numbered subcarrier of the lowest numbered resource block of the resource grid.

In the above method, in the OFDM baseband signal generation formula for the PRACH, a reference subcarrier spacing configuration $\mu_0$ is set as a value determined according to one or more subcarrier spacing configurations in an indication information received by the user equipment.

In the above method, the reference subcarrier spacing configuration $\mu_0$ is set as a subcarrier spacing configuration used by a synchronization signal/physical broadcast channel (SSB) block.

According to the present invention, a method executed by a user equipment is provided and comprises: obtaining a parameter related to generation of an orthogonal frequency division multiplexing (OFDM) baseband signal of a physical channel or signal; and generating the OFDM baseband signal of the physical channel or signal according to the parameter by using an OFDM baseband signal generation formula for the physical channel or signal, wherein in the OFDM baseband signal generation formula for the physical channel or signal, a reference subcarrier spacing configuration $\mu_0$ is set as a value determined according to one or more subcarrier spacing configurations in an indication information received by the user equipment.

In the above method, the reference subcarrier spacing configuration $\mu_0$ is set as a subcarrier spacing configuration used by a synchronization signal/physical broadcast channel (SSB) block.

According to the present invention, a user equipment is provided and comprises: a processor; and a memory configured to store instructions; wherein the instructions are executed by the processor to execute the above methods.

Invention Effect

According to the method executed by a user equipment and the user equipment of the present invention, the location of the PRACH transmission occasion in the frequency domain used by the OFDM baseband signal of the PRACH can be accurately positioned.

In addition, according to the method executed by a user equipment and the user equipment of the present invention, the definition of $\mu_0$ in the current 3GPP standard specification is improved so as to avoid conflicts of physical channels/signals transmitted by different UEs in the frequency domain.

BRIEF DESCRIPTION OF THE DRAWINGS

The above and other features of the present invention will become more apparent through the following detailed description with reference to the accompanying drawings.

DETAILED DESCRIPTION OF THE PREFERRED EMBODIMENTS

The present invention will be described in detail below with reference to the drawings and embodiments. It should be noted that the present invention should not be limited to the embodiments described below. In addition, for the sake of brevity, detailed descriptions of well-known technologies that are not directly related to the present invention are omitted to avoid confusion with the understanding of the present invention.

In the following description, the 5G mobile communication system and its subsequent evolved versions are taken as an exemplary application circumstance, under which several embodiments according to the present invention are described in detail. However, it should be pointed out that the present invention is not limited to the following embodiments but is applicable to other wireless communication systems, such as communication systems released after the 5G mobile communication system and the 4G mobile communication system released before the 5G mobile communication system.

Some terms of the present invention are described below. Unless otherwise described, the terms related to the present invention are defined hereinafter. Different naming rules in LTE, LTE-Advanced, LTE-Advanced Pro, NR and later communication systems may be adopted for the terms given by the present invention. The consistent terms are used in the present invention; however, when those terms are applied to specific systems, they can be replaced with terms adopted in a corresponding system.

3GPP: 3rd Generation Partnership Project,
BWP: Bandwidth Part, Bandwidth Part,
CP-OFDM: Cyclic Prefix Orthogonal Frequency Division Multiplexing,
DFT-s-OFDM: Discrete Fourier Transformation Spread Orthogonal Frequency Division Multiplexing,
eMBB: Enhanced Mobile Broadband.
CRB: Common Resource Block,
CSI-RS: Channel-state information reference signal,
DCI: Downlink Control Information,
DM-RS: Demodulation reference signal,
IE: Information Element,
LTE-A: Long Term Evolution-Advanced,
MAC: Medium Access Control,
MAC CE: MAC Control Element,
mMTC: massive Machine Type Communication,
NR: New Radio,
OFDM: Orthogonal Frequency Division Multiplexing,
PBCH: Physical Broadcast Channel,
PDCCH: Physical Downlink Control Channel,
PDSCH: Physical Downlink Shared Channel,
PRACH: Physical Random Access Channel,
PRB: Physical Resource Block,
PT-RS: Phase-tracking reference signal,
PUCCH: Physical Uplink Control Channel,
PUSCH: Physical Uplink Shared Channel,
Random Access Preamble,
RB: Resource Block,
RRC: Radio Resource Control,
SRS: Sounding reference signal,
SSB: SS/PBCH block,
UE: User Equipment,
URLLC: Ultra-Reliable and Low Latency Communication, Unless otherwise described, in all embodiments and exemplary methods of the present invention:

for an initial access, the "uplink BWP" refers to "initial active uplink BWP". For example, it can be configured through initialUplinkBWP in uplinkConfigCommon in SIB1 (system information block 1).

for a non-initial access, the "uplink BWP" refers to "active uplink BWP". For example, it can be configured through uplinkBWP-ToAddModList in uplinkConfig in ServingCellConfig IE.

the offset or distance between two subcarriers (or the offset or distance of one subcarrier with respect to another subcarrier) refers to the frequency offset or distance between the center frequencies of the two subcarriers and is expressed by the number of subcarriers.

the offset or distance between two resource blocks (or the offset or distance of one resource block with respect to another resource block) refers to the frequency offset or distance between the center frequencies of the lowest numbered subcarriers of the two resource blocks and is expressed by the number of resource blocks.

the usage and interpretation of mathematical symbols and mathematical expressions follow those used in the existing technology. For example:

$N_{SC}^{RB}$ refers to the number of subcarriers in one resource block (e.g., common resource block or physical resource block), and $N_{SC}^{RB}=12$.

$N_{RB}^{RA}$ is the number of resource blocks occupied by each PRACH transmission occasion in the frequency domain. For an initial access, it is expressed by the number of resource blocks for PUSCH (Physical Uplink Shared Channel) in an initial active uplink BWP. For a non-initial access, it is expressed by the number of resource blocks for PUSCH in an active uplink BWP.

Figure 2:
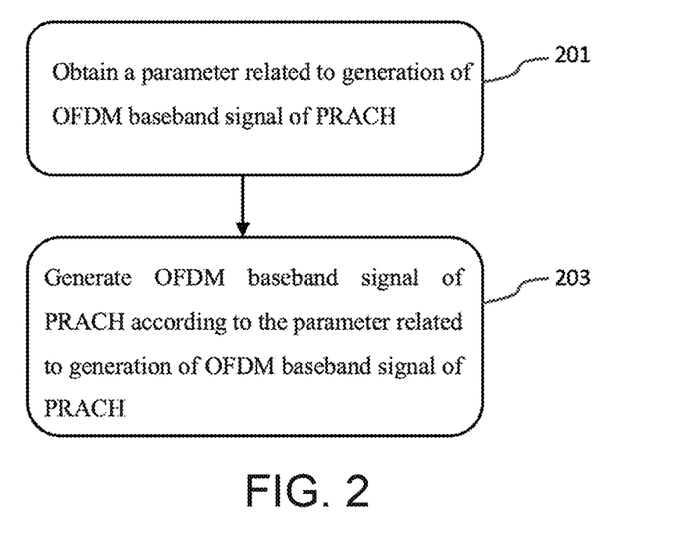
FIG. 2 is a flowchart illustrating steps executed by a user equipment of the present invention to generate an OFDM baseband signal of PRACH.

FIG. 2 is a flowchart illustrating steps executed by a user equipment UE of the present invention to generate an OFDM baseband signal of PRACH, wherein the steps executed by the user equipment LE may include the following:

In step 201, a parameter related to generation of an OFDM baseband signal of PRACH is obtained. For example, one or more parameters of the following parameters may be obtained from a base station and may be:

the uplink BWP configuration. For example, the subcarrier spacing configuration of the uplink BWP is μ (with the corresponding subcarrier spacing that is Δf), and the lowest numbered resource block (using the numbering of common resource blocks) is $N_{BWP,i}^{start}$, the random access configuration. For example, for the paired spectrum in frequency range 1 (FR1), if the PRACH configuration index (which is configured, for example, through the higher-layer parameter prach-ConfigurationIndex) is 87, then the preamble format is A1, the starting symbol is 0, the number of PRACH slots within a subframe is 1, the number of time-domain PRACH occasions within a PRACH slot, i.e., $N_t^{RA,slot}$, is 6, and the PRACH duration, i.e., $N_{dur}^{RA}$, is 2.

the resource grid configuration corresponding to the waveform numerology required for generating the OFDM baseband signal of the PRACH. For example, the numbering of the lowest numbered common resource block of the resource grid corresponding to the subcarrier spacing configuration μ of the uplink BWP is $N_{grid}^{start,\mu}$, and the number of the corresponding frequency-domain resource blocks is $N_{grid}^{size,\mu}$. For another example, the numbering of the lowest numbered common resource block of the resource grid corresponding to the reference subcarrier spacing configuration $\mu_0$ is $N_{grid}^{start,\mu_0}$, and the number of the corresponding frequency-domain resource blocks is $N_{grid}^{size,\mu_0}$. The $N_{grid}^{start,\mu}$ and $N_{grid}^{start,\mu_0}$ may be configured respectively through the parameters offsetTo-Carrier in SCS-SpecificCarrier IE corresponding to μ and $\mu_0$; and the $N_{grid}^{size,\mu}$ and $N_{grid}^{size,\mu_0}$ may be configured respectively through the parameters carrier-Bandwidth in SCS-SpecificCarrier EE corresponding to μ and $\mu_0$.

the lowest PRACH transmission occasion configuration in frequency domain. For example, the offset of the lowest PRACH transmission occasion in the frequency domain with respect to the lowest numbered resource block of the uplink BWP is $n_{RA}^{start}$, which is configured, for example, through the higher-layer parameter msg1-FrequencyStart.

the number of PRACH transmission occasions FDMed (i.e., processed by frequency-division multiplexing) in one given time instance. For example, the number of PRACH transmission occasions FDMed in one given time instance is M, which is configured, for example, through the higher-layer parameter msg1-FDM; accordingly, the value set of indexes $n_{RA}$ of the PRACH transmission occasion in the frequency domain used by the OFDM baseband signal of the PRACH may be {0, 1, . . . , M-1}.

In step 203, the OFDM baseband signal of the PRACH is generated according to the parameter related to the generation of the OFDM baseband signal of the PRACH. For example, the OFDM baseband signal of the PRACH may be expressed by using the time-continuous signal $s_l^{(p,\mu)}(t)$ as follow:

$$s_l^{(p,\mu)}(t) = \sum_{k=0}^{L_{RA}-1} a_k^{(p,RA)} \cdot e^{j2\pi(k+Kk_1+\bar{k})\Delta f_{RA}\left(t-N_{CP,l}^{RA}T_c-t_{start}^{RA}\right)}$$

Figure 3:
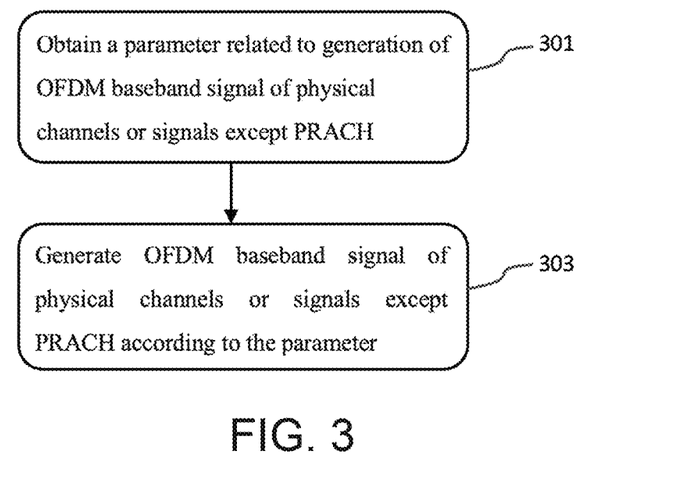
FIG. 3 is a flowchart illustrating steps executed by a user equipment of the present invention to generate an OFDM baseband signal of physical channels or signals except PRACH.

FIG. 3 is a flowchart illustrating steps executed by a user equipment UE of the present invention to generate an OFDM baseband signal of physical channels or signals except PRACH, wherein the steps executed by the user equipment UE include the following:

In step 301, a parameter related to generation of an OFDM baseband signal of physical channels or signals except PRACH is obtained. For example, the following parameters may be obtained from a base station and may be:

the resource grid configuration corresponding to the waveform numerology required for generating the OFDM baseband signal of the physical channels or signals except PRACH. For example, the numbering of the lowest numbered common resource block of the resource grid corresponding to the subcarrier spacing configuration μ used by the OFDM baseband signal of the physical channels or signals except PRACH is $N_{grid}^{start,\mu}$, and the number of the corresponding frequency-domain resource blocks is $N_{grid}^{size,\mu}$. For another example, the numbering of the lowest numbered common resource block of the resource grid corresponding to the reference subcarrier spacing configuration $\mu_0$ is $N_{grid}^{start,\mu_0}$, and the number of the corresponding frequency-domain resource blocks is $N_{grid}^{size,\mu_0}$. The $N_{grid}^{start,\mu}$ and $N_{grid}^{start,\mu_0}$ may be configured respectively through the parameters offsetTo-Carrier in SCS-SpecificCarrier IE corresponding to μ and $\mu_0$; and the $N_{grid}^{size,\mu}$ and $N_{grid}^{size,\mu_0}$ may be configured respectively through the parameters carrier-Bandwidth in SCS-SpecificCarrier IE corresponding to μ and $\mu_0$.

In step 303, the OFDM baseband signal of the physical channels or signals except PRACH is generated according to the parameter related to the generation of the OFDM baseband signal of the physical channels or signals except PRACH. For example, the OFDM baseband signal of the physical channels or signals except PRACH may be expressed by using the time-continuous signal $S_l^{(p,\mu)}(t)$ as follow:

$$s_l^{(p,\mu)}(t) = \sum_{k=0}^{N_{grid}^{size,\mu}N_{sc}^{RB}-1} a_{k,l}^{(p,\mu)} \cdot e^{j2\pi\left(k+k_0^\mu - N_{grid}^{size,\mu}N_{sc}^{RB}/2\right)\Delta f\left(t-N_{CP,l}^\mu T_c - t_{start,l}^\mu\right)}$$

The embodiments are listed below for illustrating the preferred implementations of the present invention.

Embodiment 1

Figure 4:
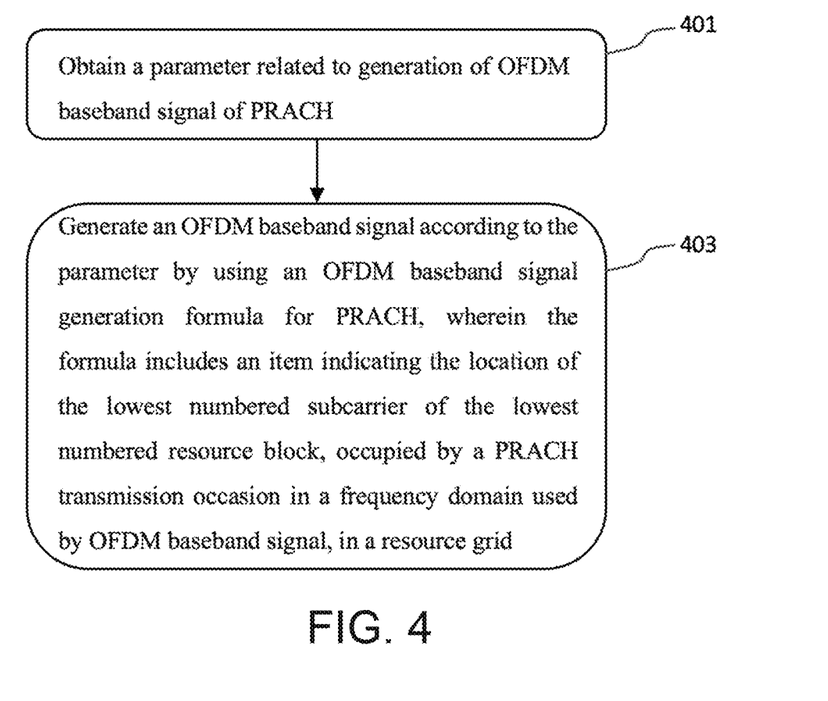
FIG. 4 is a flowchart illustrating a method executed by a user equipment according to the first embodiment of the present invention.

FIG. 4 is a flowchart illustrating a method executed by a user equipment according to the first embodiment of the present invention.

In the first embodiment of the present invention, the method executed by the user equipment UE comprises the following steps:

In step 401, a parameter related to generation of an OFDM baseband signal of PRACH is obtained. For example, one or more parameters listed in the step 201 in the flowchart (which illustrates steps executed by a user equipment UE to generate an OFDM baseband signal of PRACH) shown in FIG. 2 may be obtained from a base station.

In step 403, the OFDM baseband signal of the PRACH is generated according to the obtained parameter by using an OFDM baseband signal generation formula for the PRACH. The OFDM baseband signal generation formula for the PRACH includes an item indicating a location of a lowest numbered subcarrier of a lowest numbered resource block, which is occupied by a PRACH transmission occasion in a frequency domain used by the OFDM baseband signal of the PRACH, in a resource grid; the resource grid is a resource grid corresponding to a subcarrier spacing configuration μ of an uplink BWP; and the uplink BWP is an initial active uplink BWP or an active uplink BWP.

Specifically, in the OFDM baseband signal generation formula for the PRACH, the offset (which is expressed by the number of subcarriers) of the lowest numbered subcarrier of the lowest numbered resource block occupied by the PRACH transmission occasion in the frequency domain used by the OFDM baseband signal of the PRACH with respect to the lowest numbered subcarrier of the lowest numbered resource block of the resource grid corresponding to the subcarrier spacing configuration μ of the uplink BWP is expressed as follow:

$$(N_{BWP,i}^{start}-N_{grid}^{start,\mu})N_{SC}^{RB}+n_{RA}^{start}N_{SC}^{RB}+n_{RA}N_{RB}^{RA}N_{SC}^{RB}$$

where $N_{BWP,i}^{start}$ is the lowest numbered resource block of the uplink BWP (which uses the numbering of common resource blocks).

$N_{grid}^{start,\mu}$ is the lowest numbered resource block of the resource grid (which uses the numbering of common resource blocks).

$n_{RA}^{start}$ is an offset (which is expressed by the number of resource blocks) of the lowest numbered resource block occupied by the lowest PRACH transmission occasion in the frequency domain with respect to the lowest numbered resource block of the uplink BWP.

$n_{RA}$ is an index of the PRACH transmission occasion in the frequency domain used by the OFDM baseband signal of the PRACH.

Figure 5:
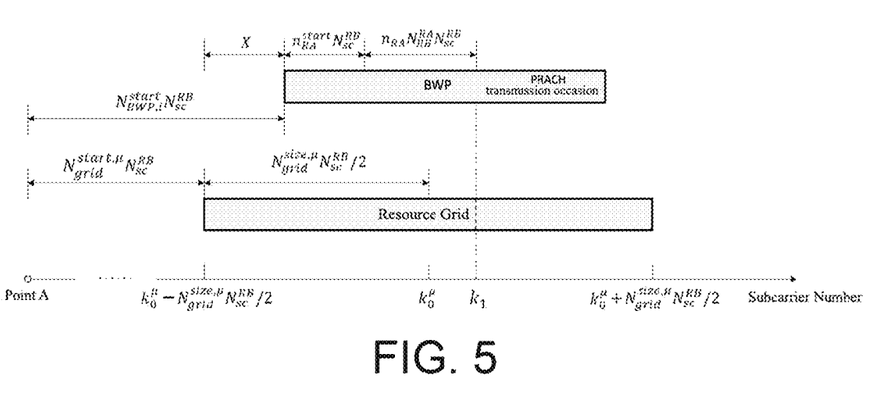
FIG. 5 is a diagram showing the relations among items constituting k1 in an OFDM baseband signal generation formula for PRACH in the first embodiment of the present invention.

For example, the baseband signal of the PRACH may be expressed by using the time-continuous signal $s_l^{(p,\mu)(t)}$ as follow:

$$s_l^{(p,\mu)}(t) = \sum_{k=0}^{L_{RA}-1} a_k^{(p,RA)} \cdot e^{j2\pi(k+Kk_1+\bar{k})\Delta f_{RA}\left(t-N_{CP,l}^{RA}T_c-t_{start}^{RA}\right)}$$

where
$K=\Delta f/\Delta f_{RA}$
$k_1=k_0^\mu+(N_{BWP,i}^{start}-N_{grid}^{start,\mu})N_{SC}^{RB}+n_{RA}^{start}N_{SC}^{RB}+n_{RA}N_{RB}^{RA}N_{SC}^{RB}-N_{grid}^{size,\mu}N_{SC}^{RB}/2$
$k_0^\mu=(N_{grid}^{start,\mu}+N_{grid}^{size,\mu}/2)N_{SC}^{RB}-(N_{grid}^{start,\mu_0}+N_{grid}^{size,\mu_0}/2)N_{SC}^{RB}2^{\mu_0-\mu}$ FIG. 5 is a diagram showing the relations among items constituting the above $k_1$ in the first embodiment of the present invention. From FIG. 5, it can be seen that the above $k_1$ in the first embodiment of the present invention may be considered to be constituted by the following two items:

$k_0^\mu-N_{grid}^{size,\mu}N_{SC}^{RB}/2$ corresponds to the lowest numbered subcarrier of the lowest numbered resource block of the resource grid corresponding to the subcarrier spacing configuration µ of the uplink BWP.

$(N_{BWP,i}^{start}-N_{grid}^{start,\mu})N_{SC}^{RB}+n_{RA}^{start}N_{SC}^{RB}+n_{RA}N_{RB}^{RA}N_{SC}^{RB}$ corresponds to the offset (which is expressed by the number of subcarriers) of the lowest numbered subcarrier of the lowest numbered resource block occupied by the PRACH transmission occasion in the frequency domain used by the OFDM baseband signal of the PRACH with respect to the lowest numbered subcarrier of the lowest numbered resource block of the resource grid corresponding to the subcarrier spacing configuration µ of the uplink BWP.

Therefore, compared with FIG. 1 showing the related items in the current 3GPP standard specification, the location of the PRACH transmission occasion in the frequency domain used by the OFDM baseband signal of the PRACH can be accurately positioned through the use of the baseband signal generation formula for the PRACH in the first embodiment of the present invention.

Embodiment 2

In the second embodiment of the present invention, the difference from the first embodiment of the present invention is that, in the OFDM baseband signal generation formula for the PRACH, the offset (which is expressed by the number of subcarriers) of the lowest numbered subcarrier of the lowest numbered resource block occupied by the PRACH transmission occasion in the frequency domain used by the OFDM baseband signal of the PRACH with respect to the lowest numbered subcarrier of the lowest numbered resource block of the resource grid corresponding to the subcarrier spacing configuration µ of the uplink BWP may be expressed as follow:

$$X+n_{RA}^{start}N_{SC}^{RB}+n_{RA}N_{RB}^{RA}N_{SC}^{RB}$$

where

X is the offset of the lowest numbered subcarrier of the lowest numbered resource block (which uses the numbering of common resource blocks) of the uplink BWP with respect to the lowest numbered subcarrier of the lowest numbered resource block (which uses the numbering of common resource blocks) of the resource grid, that is, $X=(N_{BWP,i}^{start}-N_{grid}^{start,\mu})N_{SC}^{RB}$ as shown in FIG. 5.

$n_{RA}^{start}$ is an offset (which is expressed by the number of resource blocks) of the lowest numbered resource block occupied by the lowest PRACH transmission occasion in the frequency domain with respect to the lowest numbered resource block of the uplink BWP.

$n_{RA}$ is an index of the PRACH transmission occasion in the frequency domain used by the OFDM baseband signal of the PRACH.

For example, the OFDM baseband signal of the PRACH may be expressed by using the time-continuous signal $s_l^{(p,\mu)(t)}$ as follow:

$$s_l^{(p,\mu)}(t) = \sum_{k=0}^{L_{RA}-1} a_k^{(p,RA)} \cdot e^{j2\pi(k+Kk_1+\bar{k})\Delta f_{RA}\left(t-N_{CP,l}^{RA}T_c-t_{start}^{RA}\right)}$$

where
$K=\Delta f/\Delta f_{RA}$
$k_1=k_0^\mu+X+n_{RA}^{start}N_{SC}^{RB}+n_{RA}N_{RB}^{RA}N_{SC}^{RB}-N_{grid}^{size,\mu}N_{SC}^{RB}/2$
$k_0^\mu=(N_{grid}^{start,\mu}+N_{grid}^{size,\mu}/2)N_{SC}^{RB}-(N_{grid}^{start,\mu_0}+N_{grid}^{size,\mu_0}/2)N_{SC}^{RB}2^{\mu_0-\mu}$ Same as the first embodiment of the present invention, the second embodiment according to the present invention can accurately position the location of the PRACH transmission occasion in the frequency domain used by the OFDM baseband signal of the PRACH.

Embodiment 3

Figure 6:
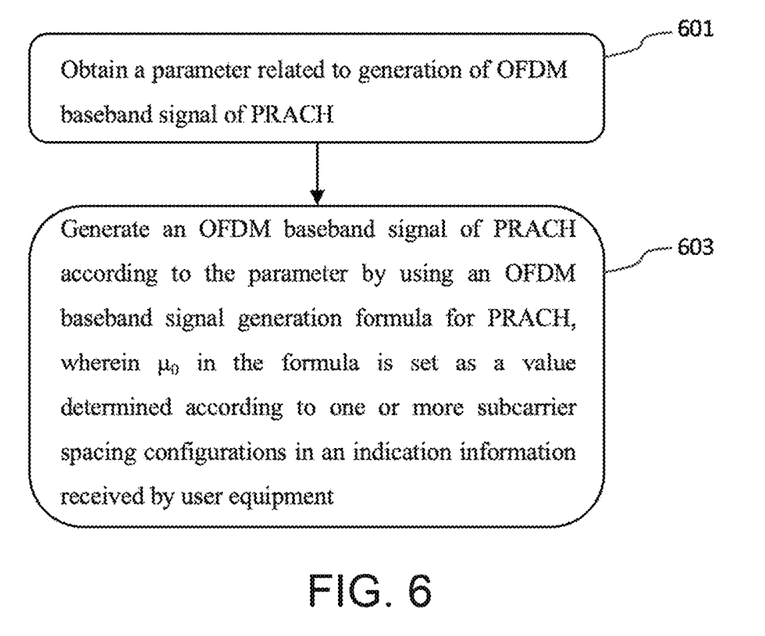
FIG. 6 is a flowchart illustrating a method executed by a user equipment according to the third embodiment of the present invention.

FIG. 6 is a flowchart illustrating a method executed by a user equipment according to the third embodiment of the present invention.

In the third embodiment of the present invention, the method executed by the user equipment UE comprises the following steps:

In step 601, a parameter related to generation of an OFDM baseband signal of PRACH is obtained. For example, one or more parameters listed in the step 201 in the flowchart (which illustrates steps executed by a user equipment UE to generate an OFDM baseband signal of PRACH) shown in FIG. 2 may be obtained from a base station.

In step 603, the OFDM baseband signal of the PRACH is generated according to the obtained parameter by using an OFDM baseband signal generation formula for the PRACH. In the OFDM baseband signal generation formula for the PRACH, a reference subcarrier spacing configuration $\mu_0$ is set as a value determined according to one or more subcarrier spacing configurations in an indication information received by the user equipment.

Specifically, in the baseband signal generation formula for the PRACH, the reference subcarrier spacing configuration $\mu_0$ is equal one of the following configurations:
- a subcarrier spacing configuration used by SS/PBCH block (SSB).
- a subcarrier spacing configuration used by System Information Block 1 (SIB 1). For example, the subcarrier spacing configuration used by SIB1 can be configured by the higher-layer parameter subCarrierSpacingCommon.
- the largest subcarrier spacing configuration configured in scs-SpecificCarrierList in FrequencyInfoUL IE.
- the smallest subcarrier spacing configuration configured in scs-SpecificCarrierList in FrequencyInfoUL IE.
- the largest subcarrier spacing configuration configured in scs-SpecificCarrierList in FrequencyInfoDL IE.
- the smallest subcarrier spacing configuration configured in scs-SpecificCarrierList in FrequencyInfoDL IE.

According to the third embodiment of the present invention, since the definition of $\mu_0$ in the current 3GPP standard specification is improved, conflicts of physical channels/signals transmitted by different UEs in the frequency domain can be avoided.

Embodiment 4

Figure 7:
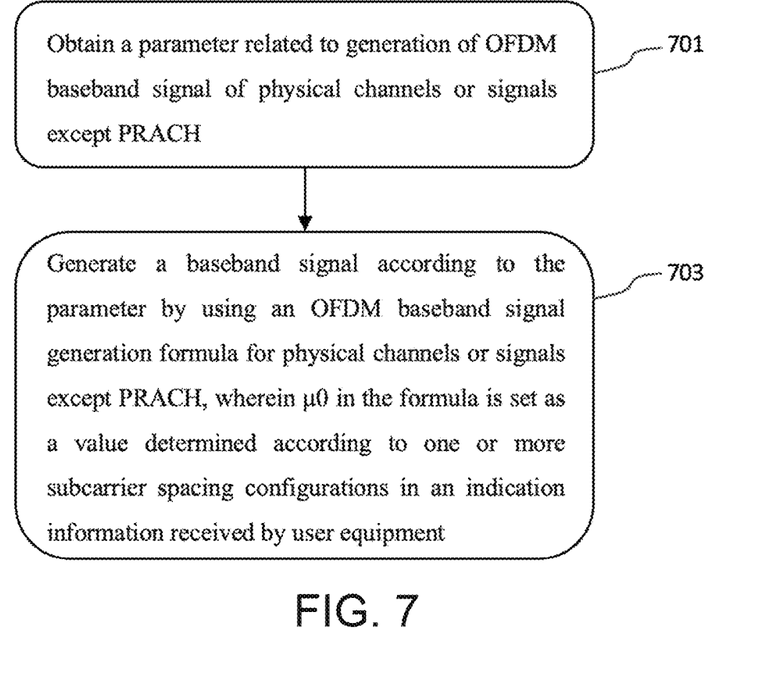
FIG. 7 is a flowchart illustrating a method executed by a user equipment according to the fourth embodiment of the present invention.

FIG. 7 is a flowchart illustrating a method executed by a user equipment according to the fourth embodiment of the present invention.

In the fourth embodiment of the present invention, the method executed by the user equipment UE comprises the following steps:

In step 701, a parameter related to generation of an OFDM baseband signal of physical channels or signals except PRACH is obtained. For example, one or more parameters listed in the step 301 in the flowchart (which illustrates steps executed by a user equipment UE to generate an OFDM baseband signal of PRACH) shown in FIG. 3 may be obtained from a base station.

In step 703, the OFDM baseband signal of the physical channels or signals except the PRACH is generated according to the obtained parameter by using an OFDM baseband signal generation formula for the physical channels or signals except the PRACH. In the OFDM baseband signal generation formula for the physical channels or signals except the PRACH, a reference subcarrier spacing configuration $\mu_0$ is set as a value determined according to one or more subcarrier spacing configurations in an indication information received by the user equipment.

Specifically, in the OFDM baseband signal generation formula for the physical channels or signals except the PRACH, the reference subcarrier spacing configuration $\mu_0$ is equal one of the following configurations:
- a subcarrier spacing configuration used by SS/PBCH block (SSB).
- a subcarrier spacing configuration used by System Information Block 1 (SIB1). For example, the subcarrier spacing configuration used by SIB1 can be configured by the higher-layer parameter subCarrierSpacingCommon.
- the largest subcarrier spacing configuration configured in scs-SpecificCarrierList in FrequencyInfoUL IE.
- the smallest subcarrier spacing configuration configured in scs-SpecificCarrierList in FrequencyInfoUL IE.
- the largest subcarrier spacing configuration configured in scs-SpecificCarrierList in FrequencyInfoDL IE.
- the smallest subcarrier spacing configuration configured in scs-SpecificCarrierList in FrequencyInfoDL IE.

Same as the third embodiment of the present invention, the fourth embodiment according to the present invention can avoid conflicts of physical channels/signals transmitted by different UEs in the frequency domain.

The fourth embodiment of the present invention is applicable to a user equipment UE that generates an OFDM baseband signal of physical channels or signals except PRACH for an uplink carrier or a supplementary uplink carrier. The physical channels or signals, which are generated for the uplink carrier or supplementary uplink carrier, except the PRACH may include PUSCH, PUCCH, DM-RS, PT-RS, SRS, etc. In addition, by just replacing "user equipment" with "base station" and replacing "obtained from a user equipment" with "obtained from a base station" in the fourth embodiment and related implementations, the fourth embodiment is also applicable to a base station that generates an OFDM baseband signal of a physical channel or signal for a downlink carrier. The physical channel or signal generated for the downlink carrier may include PDSCH, PBCH, PDCCH, DM-RS, PT-RS, CSI-RS, PSS, SSS, etc.

Figure 8:
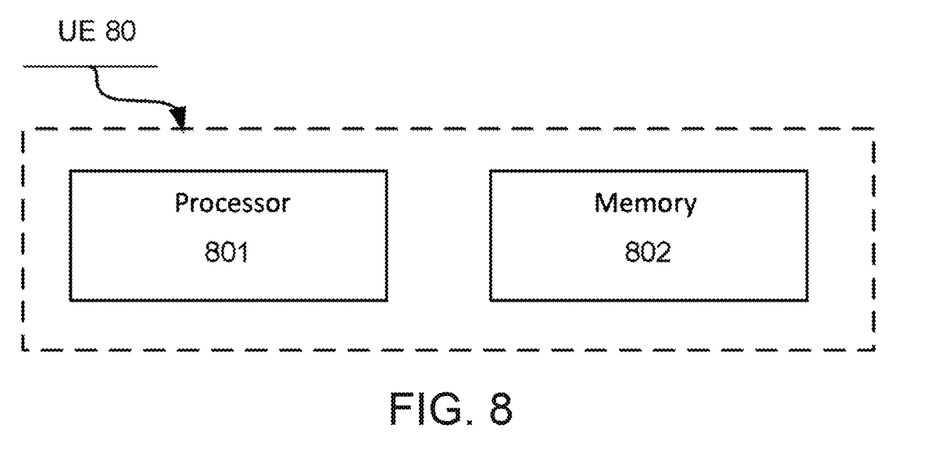
FIG. 8 is a block diagram showing a user equipment according to the present invention.

FIG. 8 is a block diagram showing a user equipment UE according to the present invention. As shown in FIG. 8, the user equipment UE80 includes a processor 801 and a memory 802. The processor 801 may include, for example, a microprocessor, a microcontroller, an embedded processor, etc. The memory 802 may include, for example, a volatile memory (e.g., a random access memory), a hard disk drive (HDD), a non-volatile memory (e.g., a flash memory), or other memories. The memory 802 stores program instructions. When the instructions are executed by the processor 801, the above methods executed by the user equipment described in detail in the present invention can be executed.

The methods and related equipment of the present invention have been described above in conjunction with preferred embodiments. Those skilled in the art may understand that the methods described above are only exemplary, and the various embodiments described above can be combined with each other under a condition where there is no conflict. The methods of the present invention are not limited to the steps and sequence described above. The network nodes and user equipment described above may include more modules, e.g., modules that may be developable or developed in the future and used for base stations, MMES, or UEs, and so on. The various identifiers described above are only exemplary rather than restrictive, and the present invention is not limited to specific information elements functioning as examples of these identifiers. Those skilled in the art can make many changes and modifications based on the teaching of the illustrated embodiment.

It should be understood that the above embodiments of the present invention can be implemented by software, hardware, or a combination of both software and hardware. For example, the various components inside the base station and user equipment in the above embodiments can be implemented by a variety of devices including, but not limited to, analog circuit devices, digital circuit devices, digital signal processing (DSP) circuits, programmable processors, application specific integrated circuits (ASIC), field programmable gate arrays (FPGA), programmable logic devices (CPLD), etc.

In this disclosure, a "base station" may refer to a mobile communication data and control exchanging center with larger transmission power and wider coverage area and include functions such as resource allocation/scheduling and data reception/transmission. A "user equipment" may refer to user mobile terminals including, for example, terminal devices such as mobile phones, notebooks, etc. that can wirelessly communicate with base stations or micro base stations.

Furthermore, the embodiments of the present invention disclosed herein can be implemented on a computer program product. More specifically, the computer program product is a product that has a computer-readable medium on which computer program logic is programmed, and when the computer program logic is executed by a computing device, it provides related operations to implement the above technical solutions of the present invention. When the computer program logic is executed by at least one processor of a computing system, it makes the processor execute the operations (methods) described in the embodiments of the present invention. This arrangement of the present invention is typically provided as software, codes and/or other data structures stored or encoded in a computer readable medium such as an optical medium (e.g., a CD-ROM), a floppy disk or a hard disk, or provided as one or more firmware or micro-codes in a ROM or RAM or PROM chip, or provided as downloadable software images, shared databases, etc. in one or more modules. Software or firmware or such a configuration may be installed on a computing device, so that one or more processors in the computing device execute the technical solutions described in the embodiments of the present invention.

In addition, each functional module or each feature of the base station equipment and terminal equipment used in each of the above embodiments may be implemented or executed by a circuit, and the circuit is usually one or more integrated circuits. Circuits designed to perform the functions described in this specification may include general-purpose processors, digital signal processors (DSP), application-specific integrated circuits (ASIC) or general-purpose integrated circuits, field programmable gate arrays (FPGA), or other programming logic devices, separate gates or transistor logics, or separate hardware components, or any combination of the above devices. The general-purpose processor may be a microprocessor, or the processor may be an existing processor, controller, microcontroller, or state machine. The above general-purpose processor or each circuit may be configured by a digital circuit or may be configured by a logic circuit. In addition, when an advanced technology that may replace current integrated circuits appears due to advances in semiconductor technology, the present invention can also use integrated circuits obtained by the advanced technology.

Although the present invention has been described above in conjunction with the preferred embodiments of the present invention, those skilled in the art will understand that various modifications, substitutions and changes can be made to the present invention without departing from the spirit and scope of the invention. Therefore, the present invention should not be limited by the above embodiments but should be limited by the appended claims and their equivalents.

What is claimed is:

1. A method performed by a user equipment, the method comprising:
   obtaining a parameter related to generation of an orthogonal frequency division multiplexing (OFDM) baseband signal of a physical random access channel (PRACH); and
   generating the OFDM baseband signal of the PRACH according to the parameter by using an OFDM baseband signal generation formula for the PRACH,
   wherein:
   the OFDM baseband signal generation formula includes an item indicating a location of a lowest numbered subcarrier of a lowest numbered resource block, which is occupied by a PRACH transmission occasion in a frequency domain used by the OFDM baseband signal, in a resource grid,
   the resource grid corresponds to a subcarrier spacing configuration of an uplink bandwidth part (BWP),
   the uplink BWP is either an initial active uplink BWP for an initial access or an active uplink BWP for a non-initial access,
   the item includes an offset of the lowest numbered subcarrier of the lowest numbered resource block occupied by the PRACH transmission occasion with respect to a lowest numbered subcarrier of a lowest numbered resource block of the resource grid,
   the offset is expressed as $$(N_{BWP,i}^{start} - N_{grid}^{start,\mu})N_{SC}^{RB} + n_{RA}^{start}N_{SC}^{RB} + n_{RA}N_{RB}^{RA}N_{SC}^{RB}$$

$N_{BWP,i}^{start}$ is a lowest numbered resource block of the uplink BWP, which uses the numbering of common resource blocks,
   $N_{grid}^{start,\mu}$ is the lowest numbered resource block of the resource grid, which uses the numbering of common resource blocks,
   $N_{SC}^{RB}$ is a number of subcarriers in one resource block,
   $N_{RA}^{start}$ is an offset of the lowest numbered resource block occupied by the lowest PRACH transmission occasion with respect to the lowest numbered resource block of the uplink BWP,
   $n_{RA}$ is an index of the PRACH transmission occasion, and
   $N_{RB}^{RA}$ is a number of resource blocks occupied by each PRACH transmission occasion in the frequency domain.

2. The method according to claim 1, wherein:
   the item is expressed as $$k_1 = k_0^{\mu} + (N_{BWP,i}^{start} - N_{grid}^{start,\mu})N_{SC}^{RB} + n_{RA}^{start}N_{SC}^{RB} + n_{RA}N_{RB}^{RA}N_{SC}^{RB} - N_{grid}^{size,\mu}N_{SC}^{RB}/2,$$

and
   $k_0^{\mu} - N_{grid}^{size,\mu}N_{SC}^{RB}/2$ corresponds to the lowest numbered subcarrier of the lowest numbered resource block of the resource grid.

3. The method according to claim 1, wherein a reference subcarrier spacing configuration in the OFDM baseband signal generation formula is set as a value determined according to one or more subcarrier spacing configurations in an indication information received by the user equipment.

4. The method according to claim 3, wherein the reference subcarrier spacing configuration is set as a subcarrier spacing configuration used by a synchronization signal/physical broadcast channel (SSB) block.

5. A user equipment, comprising:
   at least one processor; and
   at least one non-transitory computer-readable medium coupled to the at least one processor, and storing one or more computer-executable instructions that, when executed by the at least one processor, cause the user equipment to
   obtain a parameter related to generation of an orthogonal frequency division multiplexing (OFDM) baseband signal of a physical random access channel (PRACH); and generate the OFDM baseband signal of the PRACH according to the parameter by using an OFDM baseband signal generation formula for the PRACH, wherein the OFDM baseband signal generation formula includes an item indicating a location of a lowest numbered subcarrier of a lowest numbered resource block, which is occupied by a PRACH transmission occasion in a frequency domain used by the OFDM baseband signal, in a resource grid, the resource grid corresponds to a subcarrier spacing configuration of an uplink bandwidth part (BWP), the uplink BWP is either an initial active uplink BWP for an initial access or an active uplink BWP for a non-initial access, the item includes an offset of the lowest numbered subcarrier of the lowest numbered resource block occupied by the PRACH transmission occasion with respect to a lowest numbered subcarrier of a lowest numbered resource block of the resource grid, the offset is expressed as $$(N_{BWP,i}^{start} - N_{grid}^{start,\mu})N_{SC}^{RB} + n_{RA}^{start} N_{SC}^{RB} + n_{RA} N_{RB}^{RA} N_{SC}^{RB},$$

$N_{BWP,i}^{start}$ is a lowest numbered resource block of the uplink BWP, which uses the numbering of common resource blocks, $N_{grid}^{start,\mu}$ is the lowest numbered resource block of the resource grid, which uses the numbering of common resource blocks, $N_{SC}^{RB}$ is a number of subcarriers in one resource block, $n_{RA}^{start}$ is an offset of the lowest numbered resource block occupied by the lowest PRACH transmission occasion with respect to the lowest numbered resource block of the uplink BWP, $n_{RA}$ is an index of the PRACH transmission occasion, and $N_{RB}^{RA}$ is a number of resource blocks occupied by each PRACH transmission occasion in the frequency domain.

6. The UE according to claim 5, wherein:

the item is expressed as $$k_1 = k_0^\mu + (N_{BWP,i}^{start} - N_{grid}^{start,\mu})N_{SC}^{RB} + n_{RA}^{start} N_{SC}^{RB} + n_{RA} N_{RB}^{RA} N_{SC}^{RB} - N_{grid}^{size,\mu} N_{SC}^{RB}/2,$$

and $k_0^\mu - N_{grid}^{size,\mu} N_{SC}^{RB}/2$ corresponds to the lowest numbered subcarrier of the lowest numbered resource block of the resource grid.

7. The UE according to claim 5, wherein a reference subcarrier spacing configuration in the OFDM baseband signal generation formula is set as a value determined according to one or more subcarrier spacing configurations in an indication information received by the user equipment.

8. The UE according to claim 7, wherein the reference subcarrier spacing configuration is set as a subcarrier spacing configuration used by a synchronization signal/physical broadcast channel (SSB) block.

* * * * *